Figure 1:
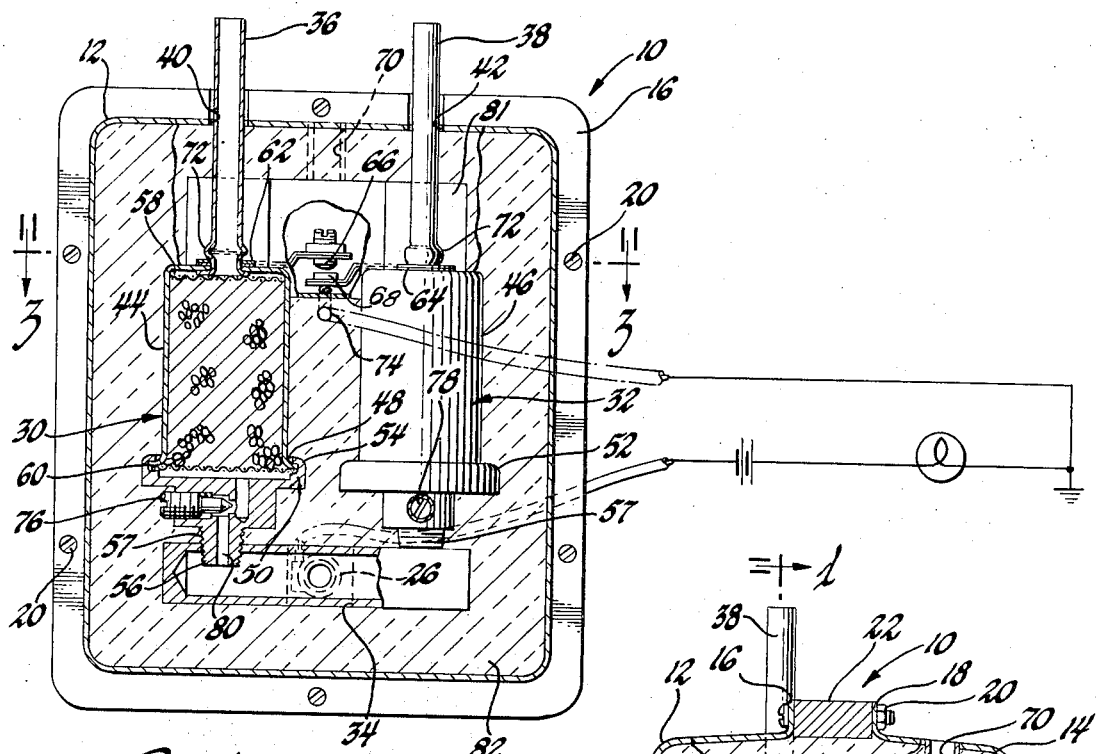

United States Patent [19]
Grabiel et al.

[11] 3,801,973
[45] Apr. 2, 1974

[54] EMISSION SENSOR

[75] Inventors: John L. W. Grabiel, Flushing; Mark N. Culver, Davison; Edwin Albert Larenz, Flint, all of Mich.

[73] Assignee: General Motors Corporation, Detriot, Mich. ; by said Gabriel

[22] Filed: Dec. 4, 1972

[21] Appl. No.: 311,923

[52] U.S. Cl. ............ 340/237 R, 23/254 E, 60/276, 337/79
[51] Int. Cl. .......................................... G08b 21/00
[58] Field of Search........... 340/237 R; 60/276, 277; 73/27; 337/79; 23/232 E, 254 E, 255 E, 277 C

[56] References Cited
UNITED STATES PATENTS

| | | | |
|---|---|---|---|
| 899,068 | 9/1908 | Philip et al.................... | 340/237 R |
| 1,770,059 | 7/1930 | Barber .......................... | 340/237 R |
| 2,040,778 | 5/1936 | Morgan........................ | 60/276 |
| 2,178,486 | 10/1939 | Menozzi....................... | 340/237 R |
| 2,428,121 | 9/1947 | Minter .......................... | 73/27 R |
| 2,605,339 | 7/1952 | Connolly....................... | 337/79 X |
| 3,503,716 | 3/1970 | Berger .......................... | 60/277 X |
| 3,577,222 | 5/1971 | Ward............................. | 23/232 E X |

*Primary Examiner*—Donald J. Yusko
*Assistant Examiner*—Daniel Myer
*Attorney, Agent, or Firm*—Peter A. Taucher

[57] ABSTRACT

This invention relates to gas sensors and more particularly to an exhaust gas sensor used in conjunction with automobile engine internal combustion engine exhaust systems. The sensor is generally an independent self-contained unit having means adapted to be directly or indirectly connected to the exhaust stream on the downstream side of a converter to provide a signal and an indication that the exhaust gas emissions passing through the converter have reached an undesirable pollutant emissions level and that the converter is therefore not functioning properly. The sensor is constructed so it can be independently mounted anywhere on the automobile but the preferred location is downstream of, and adjacent to, the catalytic converter.

6 Claims, 3 Drawing Figures

EMISSION SENSOR

This invention relates to sensors used in exhaust gas systems downstream of a catalytic converter to detect the presence of undesirable exhaust gas emissions of carbon monoxide and pure hydrocarbons out of an automobile exhaust system where the ehxaust gas had previously passed through a converter that should have eliminated or reduced such emissions, to an acceptable standard.

Problems of air pollution from internal combustion engines, and the use of catalytic converters in the exhaust system of such engines to minimize air pollution from such engines has led to the requirement for a simple and inexpensively manufactured sensing device to be used in conjunction with the converter to detect failure or improper operation of the converter. Although there are various known exhaust gas emission measuring and sensing instruments, they are for the most part rather complex and expensive pieces of apparatus to be mounted either in or adjacent to a converter to be used on each and every automobile produced. Most of the devices on the market are complicated to operate as well as to install and are also delicately constructed and therefore impractical for use as sensors in the automobile application. Sensors currently available apparently will not perform or do not perform properly in the rigorous environment and the rigorous use that they would be put to when installed on automobiles, and further any sensors now on the market that would be practical for use would be very costly and complex to produce by mass production techniques as would be required.

Accordingly, it is an object of the present invention to provide a simple, reliable and inexpensive means for sensing catalyst performance in a catalytic converter.

A further object of the invention is to provide a sensor downstream of a converter that uses inexpensive bimetal means to provide a signal when the converter is not functioning properly.

Another object of the invention is to provide a sensor that can be produced and assembled by mass production techniques.

A further object is to provide a sensor that is compact and self-contained and therefore can be adapted to be placed and used anywhere as an exhaust gas emission sensing means.

Further objects and advantages of the present invention will be apparent from the following description.

Figure 2:
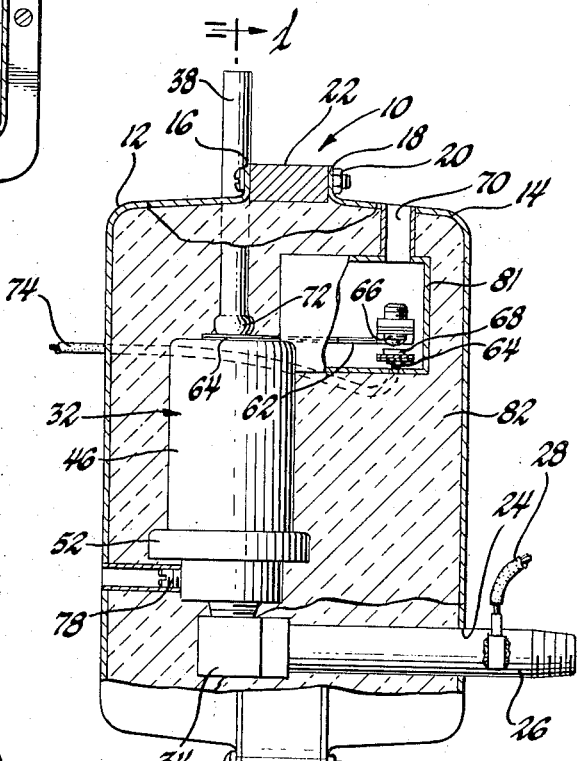

Referring now to the drawings showing a preferred embodiment of the present invention, FIG. 1 is a section view of the invention showing the interior construction thereof, and a cutaway view of one of the material holding containers within the sensor having material therein, which view is taken along section 1—1 of FIG. 2.

Figure 3:
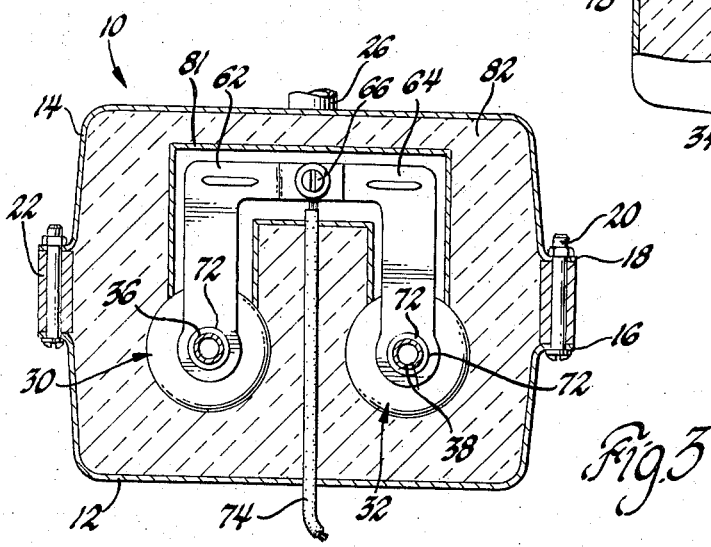

FIG. 2 is a cutaway side view of the invention showing the connection of the outside sensing means and the disposition of the contacts within the housing; and FIG. 3 is a top view taken along section 3—3 of FIG. 1.

Referring to FIG. 2, there is shown a housing 10 constructed of two similar body members 12,14 having flanges 16,18 on the outer periphery thereof. Body members 12,14 may be made of sheet metal or the like and are assembled together by a plurality of nuts and bolts 20 that extend through the peripheral flanges 16,18 on each of the body members to form the substantially hollow housing 10. It is understood, however, that any convenient means of assembling the two body members together can be used, as for example rivets, welding or the like. In the embodiment shown there is also provided a spacing member 22 or gasket in the form of a continuous ring that fits between the peripheral flanges 16,18 to provide additional width or additional room on the interior of the body member. It is understood, however, that the spacer would not be necessary if a deeper housing were used. The housing could therefore be constructed and assembled without the spacer.

As already described, housing 10 is generally hollow and has an opening 24 therein to receive an inlet pipe 26 that leads from the exterior of the housing into the interior thereof which pipe connects to the exhaust system either directly or through a separate flexible pipe or tube, or any other convenient similar connection means. A ground wire 28 is provided on pipe 26.

Referring now to FIG. 1, within housing 10 there are located two material holding containers or sampling chambers 30,32 hereinafter referred to as containers. Containers 30,32 are filled with a sampling material and are attached to a cross conduit or pipe 34 which is in turn connected to the inlet pipe 26. Cross pipe 34 interconnects both of the containers to inlet pipe 26 through a common interior orifice. Vacuum pipes 36,38 also pass through openings 40,42 in the housing member and into the containers 30,32 opposite the attachment of the containers to cross pipe 34.

Containers 30,32 are identical and are generally constructed of an integral cylindrical body 44,46 having outturned flanges 48 at one end, which flanges mate with a base 50,52 also having flanges 54 thereon that overlay flanges 48 by crimping or other convenient assembly means, to form a contiguous container body. It is understood that the containers could be made in any convenient shape. Base 50 is attached to the cross pipe 34 by threads 56 on a nipple 57 that extends from the base. Within each container there are two screesn 58,60 located at the top and bottom to hold any material placed in the containers, within the containers, and further allow exhaust gas to pass through the screens into and through the containers. The screens also prevent any material from blowing or falling out of the containers during operation. The bottom screen is held in place by the outturned flanges on the cylindrical body and base while the top screen is held in place by the material in the container. It is understood, however, that any convenient means of holding the screen within the housing could be used.

Located on each of the containers opposite base 50 are two outwardly extending bimetal arms 62,64 having contacts 66,68 thereon, with contact 66 being adjustable through opening 70 in housing 10. Bimetal arms 62,64 are attached at one end of the catalyst container by a rolled-over portion 72 on each of the vacuum pipes 36,38, and they should be of sufficient length to permit uniform flexing at their ends. It is understood that any convenient means of attaching the bimetal such as brazing, welding or the like can be used. They must, however, be attached at the top of each container. Bimetal arms 62,64 are placed within an interior frame or box portion 81 in housing 10 to isolate the arms and contact means from the insulation 82 that fills the interior of the housing. Insulation 82 is used to assure minimum heat loss from the sensor. A lead 74 is connected to contact 68 which lead is in turn connected to an indicating device.

Calibration means, in the form of screws 76,78 are provided in base 50 to control the proper amount of exhaust gas flow into each of the containers. Screws 76,78 are set screws that can be adjusted to restrict orifice 80 in base 50 that leads to the interior of the containers. By providing such calibration means, only one size of sensor need be manufactured to be used with different size converters. Calibration means 76,78 could be eliminated if only one size of converter having the same rate of exhaust flow from the converter were used.

A catalyst is the material used to fill one of the containers and is preferably a noble metal catalyst, but may be any material capable of enhancing the oxidation of Hydrocarbon (HC) and Carbon Monoxide (CO), whereas the material in the other container generally has the same thermal properties, but does not have the oxidizing properties as does the catalytic material. Both containers must be basically the same size and contain the same amount of material to allow unrestricted flow of the exhaust gases therethrough.

In operation, exhaust gases pass through pipe 26, cross pipe 34, and into and through the material in each of containers. Movement of the gas through the respective pipes and containers is assisted by means of a vacuum source attached to vacuum pipes 36,38. If the catalytic converter is functioning properly and the hydrocarbons and CO have been reduced to the required levels, contact arms 62,64 heated at the area of attachment to the catalyst containers by the heat of the gas passing through the catalyst chamber will flex at the same rate in a given direction within box 81 and the contacts remain the same distance apart and therefore remain open. If the catalytic converter is not functioning properly and an undesired level of CO and hydrocarbons are being emitted from the converter, the exhaust picked up through pipe 26 and circulated into the containers and through material in the sensor will react exothermally with the catalyst in the one container, thereby generating more heat in the one container which heat is transferred to the bimetal arm attached to that container through the container causing the one bimetal arm to flex more than the bimetal arm attached to the other container thereby unbalancing the relative movement between bimetal arms causing the contacts to close and providing a signal to an indication means, such as a light or the like, that the level of pollutants from the converter is at an undesirable level and that, therefore, the converter is no longer functioning properly. In order for the bimetal arms to function properly, the bimetal arm that is attached to the container having the catalyst therein must be the following arm. In the embodiment shown the following arm would be 64 and the container 46 would contain the catalyst material. It is understood this arrangement could be reversed.

As a modification, of the sensors, it is understood that the containers could be made in one piece having screens below the opening 80 and within the vacuum pipes 36,38. A fill hole and plug therefor would be required in each of the containers if so constructed.

While the embodiments of the invention as herein disclosed constitute a preferred form, it is to be understood that other forms could be adopted.

I claim:

1. An exhaust gas emission sensor comprising: separate hollow body members joined at their peripheries to form a housing; two containers within said housing having materials therein with the material in one container including an active catalyst; means in said housing adapted to connect the two containers to an exhaust gas source allowing the exhaust gas to pass through the materials in said containers, bimetal members in fixed relationship to each other having contacts thereon attached to each of said containers; one of said contacts being connected to a remote indicator; whereby upon said exhaust gas reaching an undesirable level of pollutants, the material that includes the catalyst reacts, to cause a greater heat transfer to said bimetal member attached thereto to unbalance the fixed relationship between the bimetal members wherein the contacts close to provide a signal to a remote indicator.

2. An exhaust gas emission sensor comprising: two body members that are held together by peripheral flanges to form a hollow enclosed housing; a pair of containers within said housing; secured on each of said respective containers are bimetal arms having contacts with one of said contacts being connected to a remote indicator; each of said containers being connected to a vacuum source at one end and an exhaust gas source at the other end through pipe means; said pipe means extend through orifices in the top and bottom respectively of said containers and said housing; one of said containers having material therein that includes an active catalyst, with the other container having similar material therein without the catalyst, whereby upon the exhaust gas passing through the containers and by the vacuum source reaching an undesirable level of pollutants, said material containing the active catalyst will be ignited thereby creating a greater heat transfer through said container to said bimetal arm attached thereto, to heat said bimetal arm to thereby create an unbalance in said arms, causing the contact means to close to provide a signal to the remote indicator.

3. An exhaust gas emission sensor comprising: two hollow body members having peripheral flanges thereon and being secured together at the peripheral flanges to form a hollow enclosed housing; a pair of container means within said housing; bimetal arms having contacts thereon within a cavity in said housing and being attached to each of said respective container means, one of said contacts being electrically connected to an indicator; insulation within said housing surrounding said container means to prevent heat loss therefrom; each of said container means being connected to a vacuum source at one end thereof to draw exhaust gas through the containers and interconnected to each other and to an exhaust gas source at the other end through pipe means; the vacuum source and pipe means extend through orifices in the top and bottom respectively of each of said containers and said housing; one of said container means including a material having an active catalyst, and the other one of said container means containing a material without the catalyst; whereby when said exhaust gas passing through said sensor reaches an undesirable level of CO and hydrocarbons said material containing the active catalyst will be ignited thereby creating a greater heat transfer through said container to said bimetal arm attached thereto, to heat said bimetal arm a greater amount than the bimetal arm attached to the other container to create an unbalance in said arms, causing the contact means to close to provide a signal to an indicator.

4. An exhaust gas emission sensor as set forth in claim 3, wherein said containers include adjustment means to permit adjustment of the exhaust gas flow therethrough.

5. An exhaust gas emission sensor as set forth in claim 4 wherein said containers are connected to the exhaust gas by an inlet pipe into said housing and are interconnected through a cross pipe having an orifice therein that is attached to said inlet pipe.

6. An exhaust gas emission sensor as set forth in claim 5 wherein said containers each include screen means separated from each other to retain the material in said containers.

* * * * *